United States Patent

Fukui et al.

[11] Patent Number: 6,154,316
[45] Date of Patent: Nov. 28, 2000

[54] POLARIZER LABELLING TAPE AND METHOD FOR MAKING THE SAME

[75] Inventors: Hitoshi Fukui; Kenji Tanaka, both of Kyoto, Japan

[73] Assignee: Rohm Co., Ltd., Kyoto, Japan

[21] Appl. No.: 08/177,763

[22] Filed: Jan. 4, 1994

[30] Foreign Application Priority Data

Jan. 29, 1993 [JP] Japan .................................. 5-013628

[51] Int. Cl.[7] .................................. G02B 5/30; B31F 5/00
[52] U.S. Cl. ........................... 359/483; 359/501; 156/157; 156/159; 156/502; 156/509
[58] Field of Search ..................... 359/483, 489, 359/501, 900; 156/502, 509, 157, 159

[56] References Cited

U.S. PATENT DOCUMENTS

| | | | |
|---|---|---|---|
| 2,185,018 | 12/1939 | Sauer | 359/489 |
| 3,054,204 | 9/1962 | Yates | 359/489 |
| 3,319,519 | 5/1967 | Shelanski | 359/489 |
| 3,436,290 | 4/1969 | Reissner | 156/157 |
| 3,536,550 | 10/1970 | Von Hofe | 156/159 |
| 4,240,854 | 12/1980 | Massey et al. | 156/157 |
| 4,865,669 | 9/1989 | Schmidt | 156/159 |

*Primary Examiner*—Ricky D. Shafer
*Attorney, Agent, or Firm*—William H. Eilberg

[57] ABSTRACT

A polarizer labelling tape comprises a series of releasable strips which are connected end-to-end to each other by adhesive strips arranged at respective connections between the releasable strips, and a plurality of polarizer elements releasably attached to and along the series of releasable strips, each of the polarizer elements being covered by a protective layer. The releasable strips of the tape may be constituted by a releasable layer originally present in a master polarizer plate.

7 Claims, 9 Drawing Sheets

POLARIZER LABELLING TAPE AND METHOD FOR MAKING THE SAME

BACKGROUND OF THE INVENTION

1. Field of the Invention

This invention relates to a polarizer labelling tape which is used for successively supplying plate-like polarizer elements onto liquid crystal panels. The present invention also relates to a method for making such a tape.

2. Description of the Prior Art

In a liquid crystal display device, the liquid crystal panel is sandwiched between a pair of plate-like polarizer elements. The pair of polarizer elements cooperate with the liquid crystal for allowing or interrupting light passage through the display device at selected dots for making an intended display of an image.

There are mainly two conventional methods of attaching a plate-like polarizer element to each surface of a liquid crystal panel.

Figure 17:
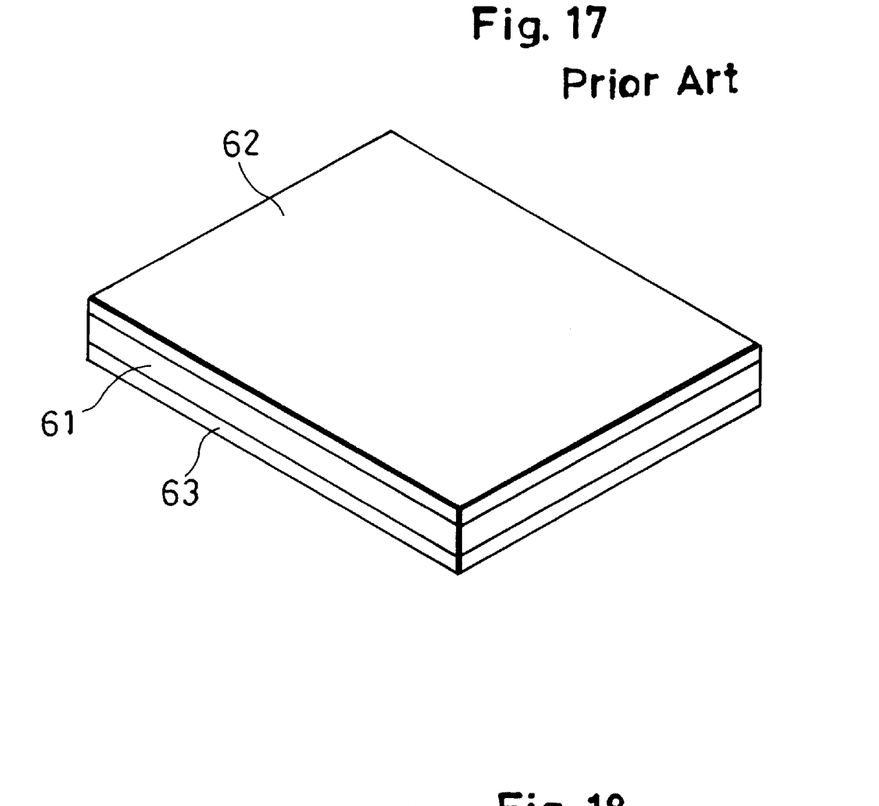
FIG. 17 is a perspective view showing a conventional chip-type polarizer.

A first conventional method utilizes a polarizer chip, as shown in FIG. 17 of the accompanying drawings. Specifically, the polarizer chip comprises a single plate-like polarizer element 61 interposed between a protective cover 62 and a releasable sheet 63. The polarizer element 61 has a size equal to that of a liquid crystal panel to which it is applied.

Due to difficulty of peeling the releasable sheet 63 at the time of mounting the polarizer chip to a surface of the liquid crystal panel, the releasable sheet 63 is first brought into attachment to a peeling adhesive sheet (not shown) which has a higher adhesion than the releasable sheet 63. When the polarizer chip is forcibly pulled away from the peeling adhesive sheet, the releasable sheet is adhered to the peeling adhesive sheet, thereby enabling mounting of the polarizer chip to the relevant surface of the liquid crystal panel.

Obviously, the use of the polarizer chip is disadvantageous in that the peeling adhesive tape is additionally needed for mounting the chip to the liquid crystal panel, thereby resulting in a production cost increase and difficulty of automation. Further, when a plurality of such chips need be successively mounted, the chips must be handled separately, consequently leading to a low productivity.

Figure 18:
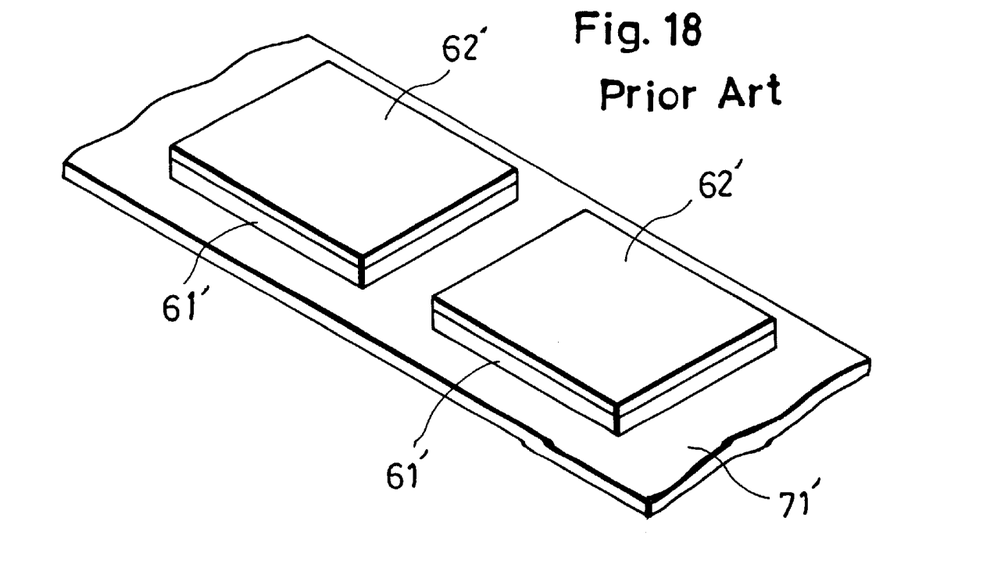
FIG. 18 is a perspective view showing a conventional polarizer labelling tape.

As shown in FIG. 18, a second conventional method utilizes a releasable tape 71' to which a plurality of plate-like polarizer elements 61' each covered by a protective film 62' are attached. The use of such a tape eliminates the problem of separately handling the polarizer elements 61'.

However, each of the polarizer elements 61' is originally attached to its own releasable sheet (like the prior art of FIG. 17) which is peeled off before attachment to the releasable tape 71'. Thus, the releasable tape 71 is an additional element which causes a production cost increase. Further, the need for peeling the original releasable sheet before attachment to the tape is also a time-taking step.

SUMMARY OF THE INVENTION

It is, therefore, an object of the present invention to provide a polarizer labelling tape which, while facilitating attachment of polarizer elements to respective liquid crystal panels, can be made by utilizing a releasable layer originally present in a master polarizer plate.

Another object of the present invention is to provide a method for conveniently making such a polarizer labelling tape.

According to one aspect of the present invention, there is provided a polarizer labelling tape comprising: a series of releasable strips which are connected end-to-end to each other by adhesive strips arranged at respective connections between the releasable strips; and a plurality of polarizer elements releasably attached to and along the series of releasable strips, each of the polarizer elements being covered by a protective layer.

According to the arrangement described above, the releasable strips are connected in series by the adhesive strips to form a continuous tape. Thus, each of the releasable strips per se need not be continuous, so that a releasable layer originally present in a master polarizer plate can be used for providing the releasable strips. As a result, it is no longer necessary to peel off the releasable layer of the master polarizer plate and to separately prepare a continuous releasable tape as a new carrier for the polarizer elements.

Preferably, the polarizer labelling tape may be wound into a roll for convenience of storing and handling.

According to an embodiment of the present invention, each of the releasable strips has a parallel pair of longer edges and a parallel pair of shorter edges, and the shorter edges extend perpendicularly to the longer edges. In this case, at least two of the polarizer elements may be spaced from each other longitudinally of the series of releasable strips, the space corresponding to a defective polarizer element. Alternatively, all of the polarizer elements may be arranged intimately with each other longitudinally of the series of releasable strips.

According to another embodiment of the present invention, each of the releasable strips has a parallel pair of longer edges and a parallel pair of shorter edges, and the shorter edges are inclined relative to the longer edges. In this case, two of the polarizer elements located adjacent to each of the connections between the releasable strips are spaced from each other longitudinally of the series of releasable strips.

According to another aspect of the present invention, there is provided a method for making a polarizer labelling tape comprising the steps of: preparing a master polarizer plate which comprises a polarizer layer interposed between a protective layer and a releasable layer; dividing the master plate into a plurality of sub-master polarizer strips each having a predetermined width; connecting the sub-master strips end-to-end in series by adhesive strips attached to the releasable layer at respective connections between the sub-master strips to provide a polarizer strip series; subjecting the strip series to defect inspection; partially removing the polarizer layer and protective layer of the strip series at any defective portions while leaving the releasable layer; and forming half-cuts in the strip series short of the releasable layer for sectioning the remainder of the polarizer layer and protective layer into a plurality of polarizer elements which are separably attached to the releasable layer of the strip series.

The above-described method may further comprises winding the polarizer labelling tape into a roll. Moreover, the defect inspection is performed with inspection of the connections between the sub-master strips, and the method further comprises partially removing the polarizer layer and protective layer of the strip series also at said connections while leaving the releasable layer.

According to a further aspect of the present invention, there is provided a method for making a polarizer labelling tape comprising the steps of: preparing a master polarizer plate which comprises a polarizer layer interposed between a protective layer and a releasable layer; dividing the master plate into a plurality of sub-master polarizer strips each having a predetermined width; subjecting each of the sub-master strips to defect inspection; fully removing any defective portions from the sub-master strips; and forming half-cuts in the remaining portions of the sub-master strips short of the releasable layer for sectioning the remainder of the polarizer layer and protective layer into a plurality of polarizer elements which are separably attached to the releasable layer; and connecting the remaining portions of the sub-master strips end-to-end in series by adhesive strips attached to the releasable layer at respective connections between the remaining portions of the sub-master strips to provide a polarizer strip series.

Again, it is preferable that the polarizer labelling tape be wound into a roll.

Other objects, features and advantages of the present invention will be fully understood from the following detailed description given with reference to the accompanying drawings.

DETAILED DESCRIPTION OF THE PREFERRED EMBODIMENTS

Figure 1:
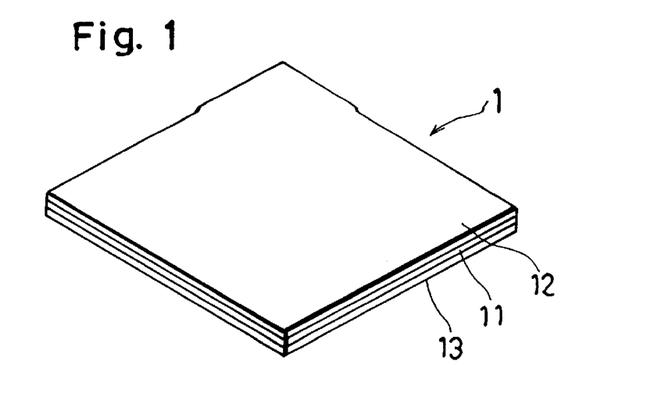
FIG. 1 is a perspective view showing a master polarizer plate which is used for making a polarizer labelling tape according to a first embodiment of the present invention.

Referring to FIG. 1 of the accompanying drawings, there is shown a master polarizer plate 1 used as a starting material for making a polarizer labelling tape according to a first embodiment of the present invention. The master polarizer plate 1 comprises a polarizer layer 11 having one surface covered by a protective layer or film 12. The other surface of the polarizing layer 11 is covered by a releasable layer or sheet 13. The master plate 1 may be rectangular or square.

Figure 2:
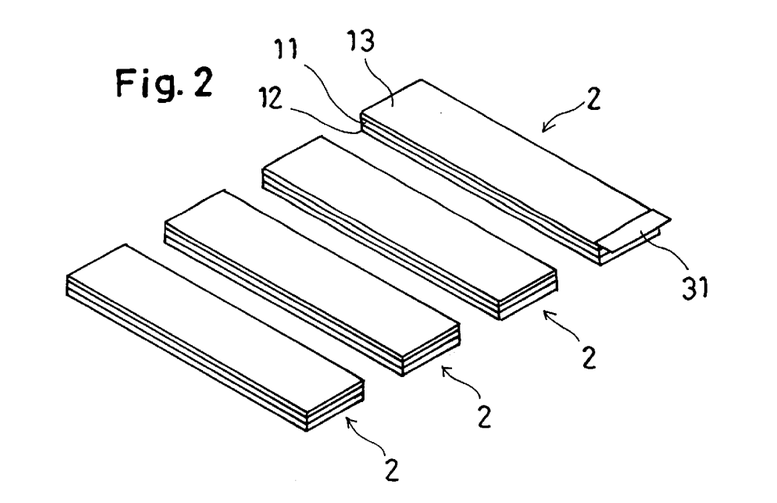
FIG. 2 is a perspective view a plurality of sub-master polarizer strips which are obtained by dividing the master polarizer plate.

For making a polarizer labelling tape, a plurality of such master polarizer plates 1 are stacked in a stocker (not shown) and supplied one after another to a cutting unit (not shown). At the cutting unit, each of the master plates is fully cut perpendicularly to two opposite sides of the original rectangle or square (namely, in parallel to the other two sides of the rectangle or square) to divide the master plate into a plurality of sub-master polarizer strips 2, as shown in FIG. 2. Each of the strips 2 has a predetermined width corresponding to the width of a liquid crystal panel (not shown) to which the product polarizer element is applied. If any one of the strips (usually the last divided strip) is insufficient in width, it need be discarded.

Figure 3:
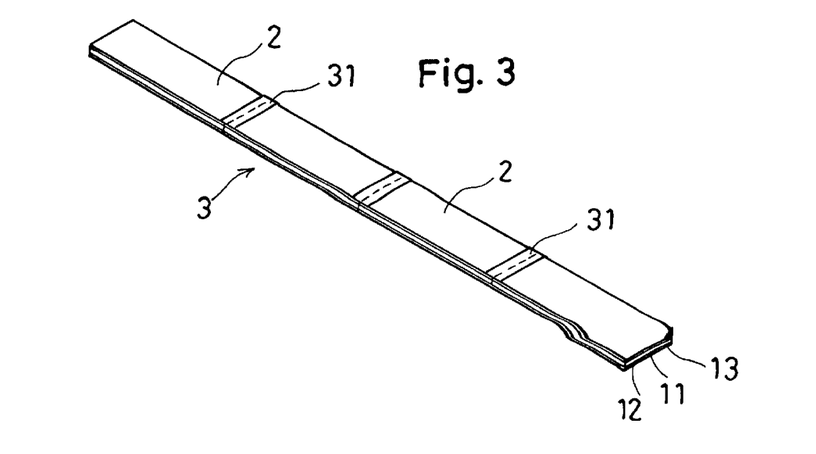
FIG. 3 is a perspective view showing a tape obtained by connecting the sub-master polarizer strips in series.

Subsequently, the sub-master polarizer strips 2 thus obtained are connected end-to-end in series by adhesive strips 31, as shown in FIG. 3.

Figure 4:
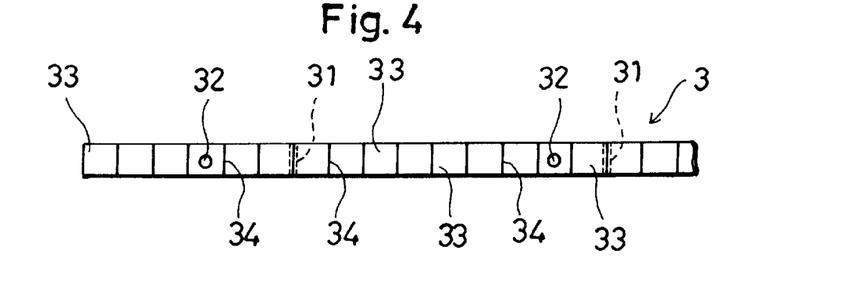
FIG. 4 is a plan view showing the same tape after undergoing a defect inspecting step.

Then, the series 3 of sub-master strips is subjected to inspection for finding and marking defects, as indicated at 32 in FIG. 4.

Then, half cuts 34 are formed in the strip series 3 for sectioning the strip series 3 into defective elements 32 and acceptable elements 33, as also shown in FIG. 4. Each of the half cuts 34 penetrates only through the polarizer layer 11 and the protective layer 12 while leaving the releasable layer 13 uncut, thereby preventing complete severing of the strip series 3. The length of each acceptable element 33, which is the interval between each two adjacent half cuts 34, corresponds to the length of the applicable liquid crystal panel.

Figure 5:
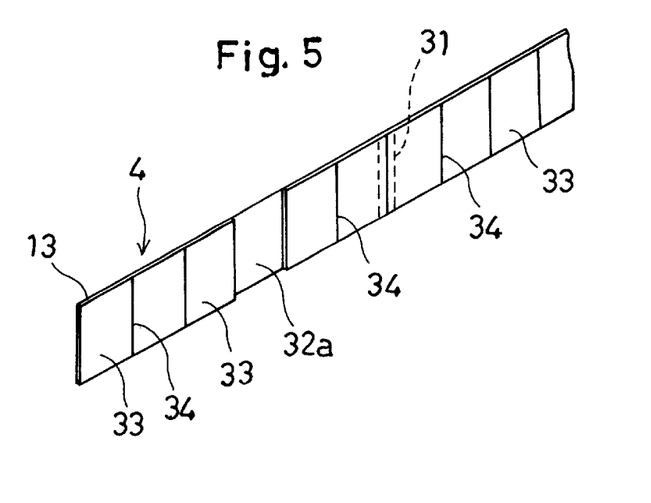
FIG. 5 is a perspective view showing the same tape after completing a half-cutting step.

Then, the polarizer layer 11 and protective layer 12 of the strip series 3 are partially removed only at the defective chips 32 while leaving the releasable layer 13, as represented by 32a in FIG. 5. As a result, a polarizer labelling tape 4 carrying only the acceptable polarizer elements 33 is obtained.

Figure 6:
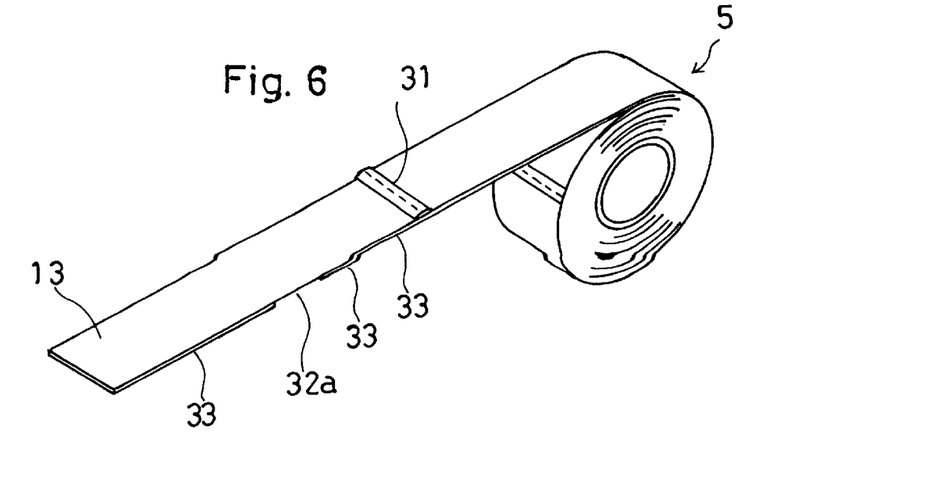
FIG. 6 is a perspective view showing a roll obtained by winding the same tape.

Finally, the polarizer labelling tape 4 is wound on a reel (not shown) with a predetermined torque to provide a roll 5, as shown in FIG. 6. The tape roll 5 thus obtained can be used for successively attaching the polarizer elements to liquid crystal panels in a convenient way.

Figure 7:
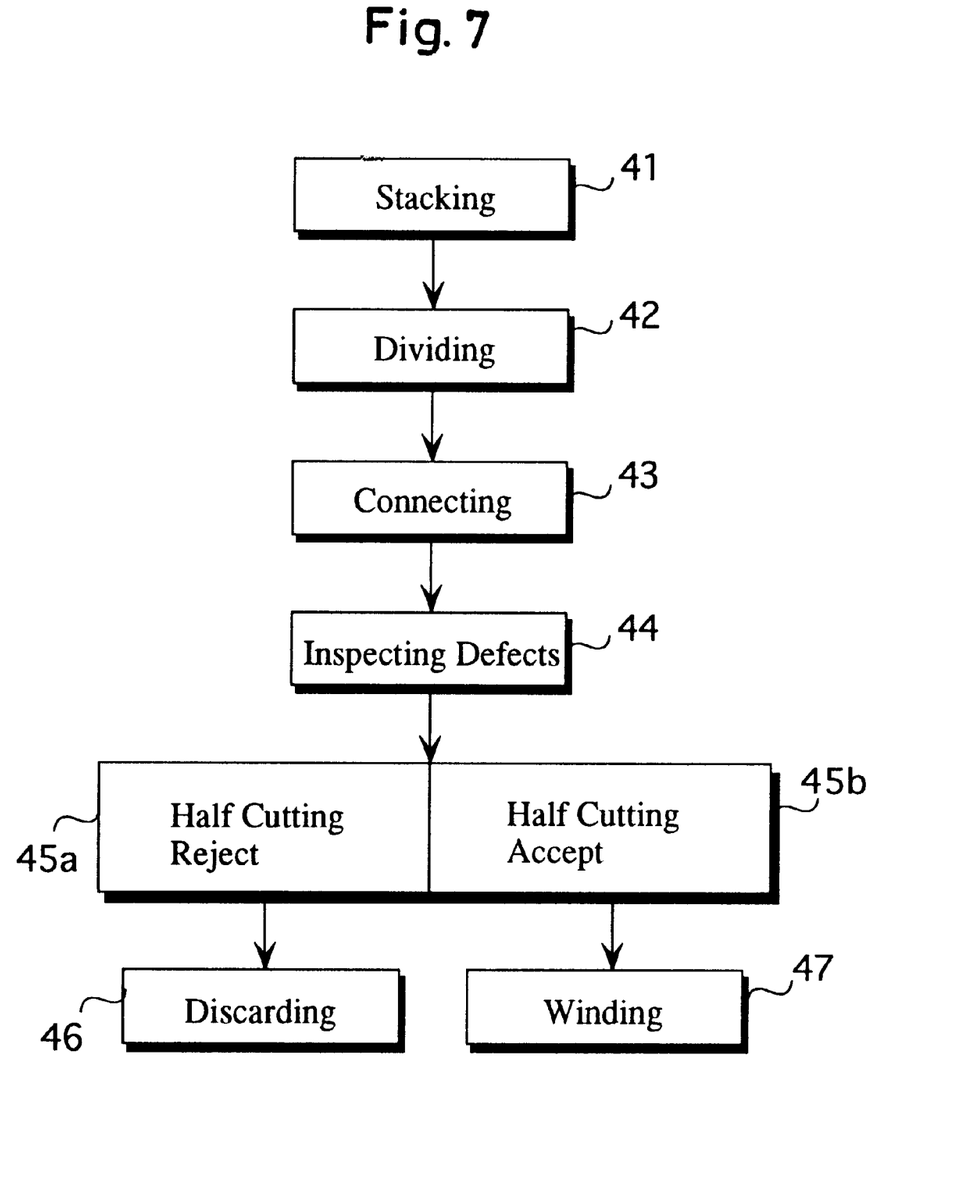
FIG. 7 is a flow diagram showing the entire method of making the polarizer labelling tape according to the first embodiment of the present invention.

The process flow of the above-described method is conveniently illustrated in the flow diagram of FIG. 7. Specifically, in Step 41, a plurality of master polarizer plates 1 (FIG. 1) are stacked. In Step 42, each of the master plates 1 is divided into a plurality of sub-master polarizer strips 2 (FIG. 2). In Step 43, the sub-master strips 2 are connected in series (FIG. 3). In Step 44, the series 3 of sub-master strips is subjected to inspection to find and mark defects 32 (FIG. 4). In Steps 45a and 45b, half cutting is performed with respect to the strip series 3 for sectioning into defective elements 32 and acceptable elements 33 (also FIG. 4). In Step 46, the defective elements 32 are removed from the releasable layer 13 (FIG. 5) to provide a polarizer labelling tape 4 carrying only the acceptable elements 34. In Step 47, finally, the tape 4 is wound into a roll 5.

According to the method described above, the releasable layer 13 which is originally present in the master polarizer plate 1 (FIG. 1) is utilized for connecting the sub-master polarizer strips 2 (FIG. 2) in a series. Thus, there is no need for removing the acceptable polarizer elements 33 from the original releasable layer 13 and for attaching them to a separate continuous releasable tape. As a result, the polarizer labelling tape can be made at a higher speed and at a lower cost than is possible with the prior art.

Figure 8:
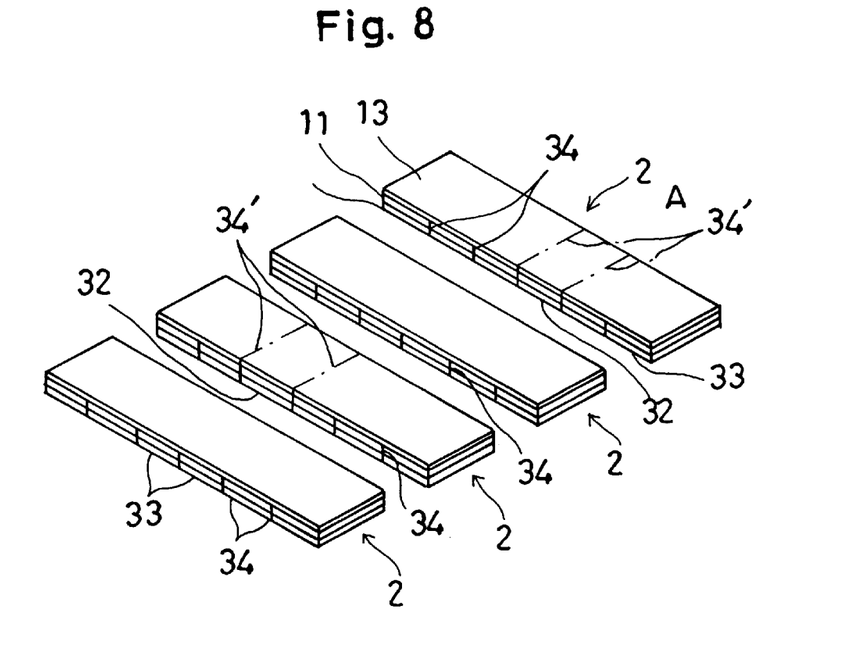
FIG. 8 is a perspective view similar to FIG. 2 but showing a second embodiment of the present invention.

FIGS. 7 to 10 illustrate a method for making a polarizer labelling tape according to a second embodiment of the present invention. The second embodiment is substantially the same as the first embodiment up to Step 42 (FIG. 10) wherein the master polarizer plate 1 is divided into a plurality of sub-master polarizer strips 2, as shown in FIG. 8.

However, Step 42 is followed by Step 44' wherein each of the sub-master strips 2 is subjected to inspection for finding and marking a defect 32 (see also FIG. 8).

In Step 45a', full cuts 34' are formed in the relevant sub-master strip 2 on both sides of the defect 32. Further, in Step 46', the defective portion 32 is removed for discarding, as indicated by an arrow A in FIG. 8.

In Step 45b, on the other hand, half cuts 34 are formed in each sub-master strip 2 and/or shorter pieces resulting from the removal of the defective portion 32 for sectioning into acceptable polarizer elements 33, as also shown in FIG. 8.

Figure 9:
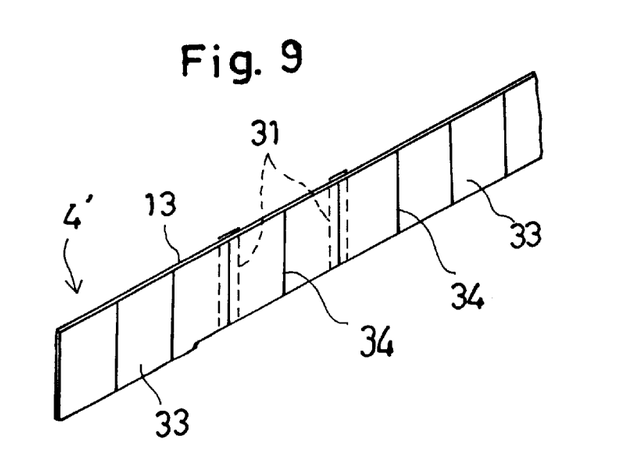
FIG. 9 is a perspective view similar to FIG. 5 but showing a polarizer labelling tape of the second embodiment.
Figure 10:
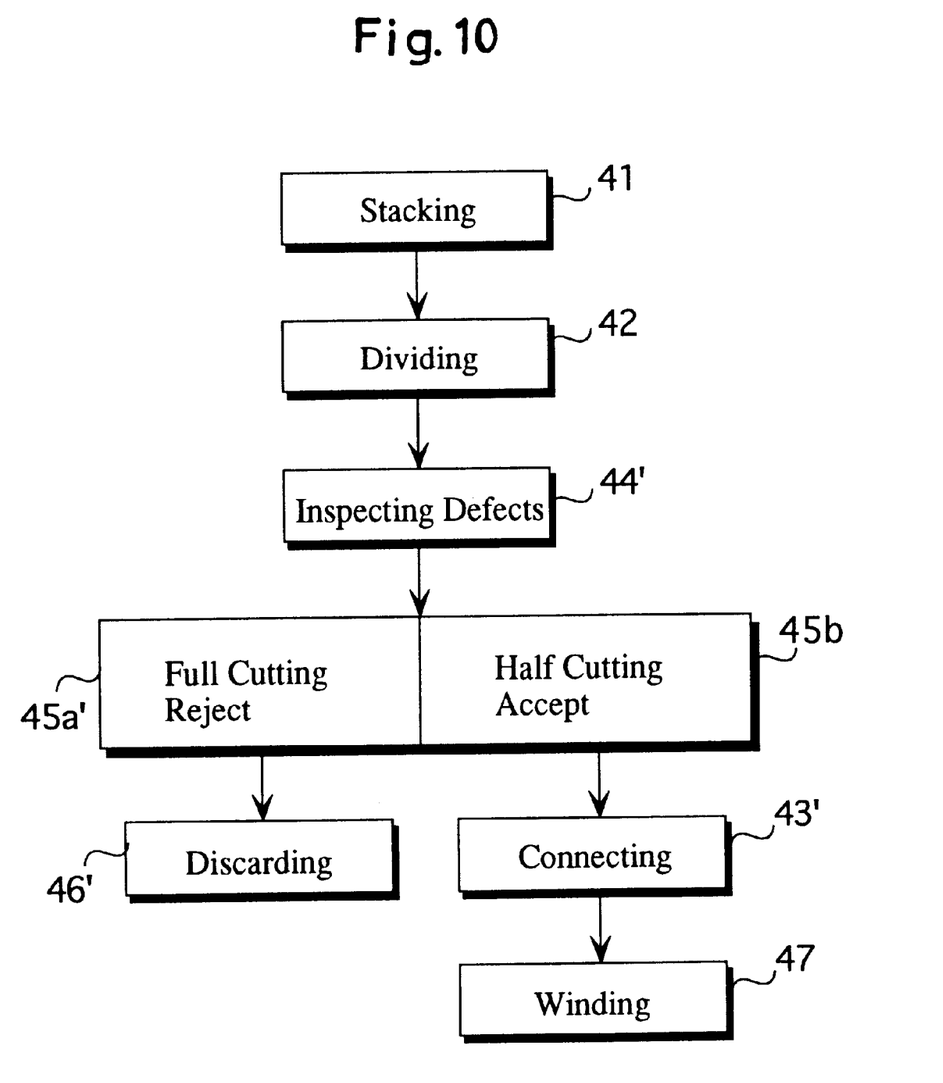
FIG. 10 is a flow diagram showing the entire method of making the polarizer labelling tape according to the second embodiment of the present invention.

Subsequently, in Step 43', the respective sub-master strips 2 and/or shorter pieces are connected end-to-end in series by using adhesive strips 31, as shown in FIG. 9. As a result, a polarizer labelling tape 4' is obtained which releasably retains the acceptable polarizer elements 33.

Obviously, due to the use of the releasable layer 13 which is originally present in the master polarizer plate 1 (see FIG. 1), the polarizer labelling tape 4' of the second embodiment also has substantially the same advantages as that of the first embodiment. Further, the second embodiment is additionally advantageous in that the polarizer elements 33 are held intimately with each other substantially without any interval, thereby increasing the number of polarizer elements per unit length of the tape and facilitating successive supply of the polarizer elements at the time of attaching them to respective liquid crystal panels (not shown).

In either of the foregoing embodiments, the division of the master polarizer plate 1 into the sub-master strips 2 is performed by fully cutting the master plate perpendicularly to two opposite sides thereof. Such a cutting direction is used when the desired angle of the polarization axis of each polarizer element is 0 or 180 degrees. However, in some application, it becomes necessary to use a polarizer whose polarization axis is inclined by a predetermined angle (e.g. 45 or 135 degrees).

Figure 11:
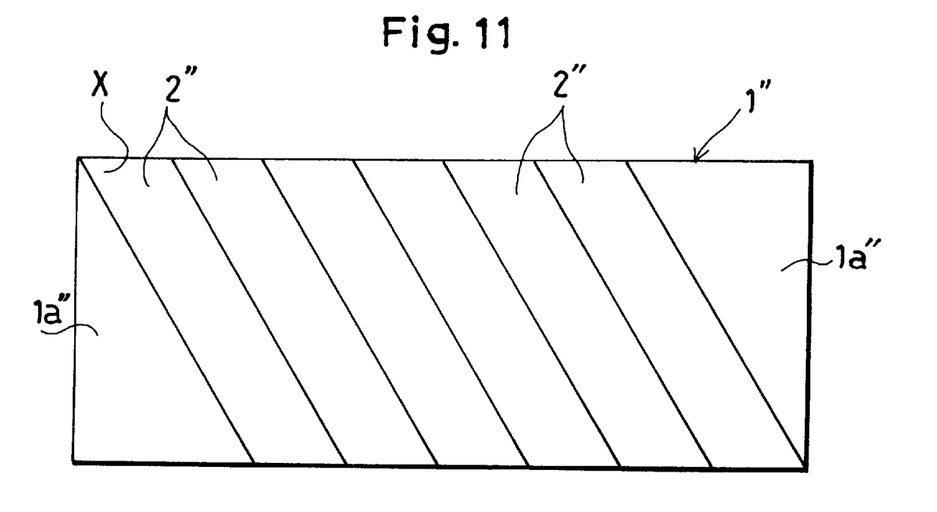
FIG. 11 is a plan view showing a master polarizer plate which is used for making a polarizer labelling tape according to a third embodiment of the present invention.

FIGS. 11 to 16 show a third embodiment which is particularly suitable when each polarizer element is required to have an inlined polarization axis. According to this embodiment, use is made of an elongate master polarizer plate 1" as a starting material, as shown in FIG. 11. Though not specifically illustrated, the elongate master plate 1" also has a triple layer structure which includes a polarizer layer sandwiched between a protective layer and a releasable layer, similar to the first embodiment (see FIG. 1).

In Step 41 (FIG. 16), a plurality of such elongate master polarizer plates 1" are stacked in a stocker (not shown) and supplied one after another to a cutting unit (not shown).

In Step 42, each of the master plates is fully cut at an angle X relative to the longitudinal sides of the master plate to divide the master plate into a plurality of sub-master polarizer strips 2" each of which is parallelogrammic, as also shown in FIG. 11. Each of the strips 2" has a predetermined width corresponding to the width of a liquid crystal panel (not shown) to which the product polarizer element is applied. The inclination angle X may be 45 degrees for example. After cutting, two excess end portions 1a" are inevitably generated which are discarded. Obviously, the percentage occupied by the excess end portions 1a" can be reduced by increasing the length of the master polarizer plate 1".

Figure 12:
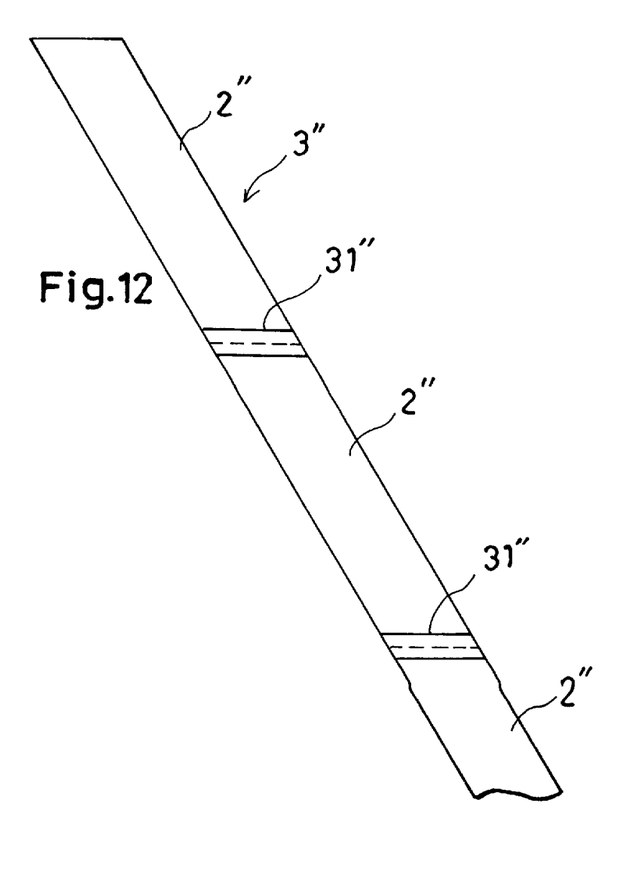
FIG. 12 is a plan view showing a plurality of sub-master polarizer strips which are obtained by dividing the master polarizer plate of FIG. 11 and later connected in series to form a polarizer labelling tape.

In Step 43, the parallelogrammic sub-master polarizer strips 2" thus obtained are connected end-to-end in series by adhesive strips 31" each of which is also parallelogrammic, as shown in FIG. 12.

Figure 13:
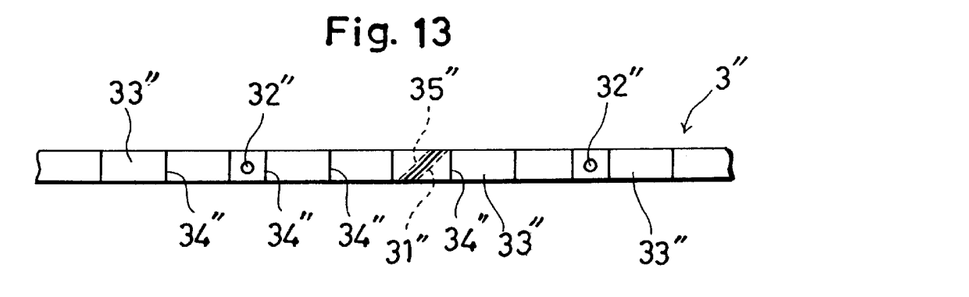
FIG. 13 is a plan view showing the same tape after undergoing a defect inspecting step.

In Step 44", the series 3" of sub-master strips is subjected to inspection for finding and marking defects 32" and connections 35", as shown in FIG. 13.

In Steps 45a" and 45b," half cuts 34" are formed in the strip series 3" for sectioning the strip series into defective elements 32", acceptable elements 33" and connections 35", as also shown in FIG. 13. The extending direction of the half cuts 34" is perpendicular to the longitudinal sides of the strip series 3" to provide an inclined polarization axis for the respective acceptable elements 33".

Figure 14:
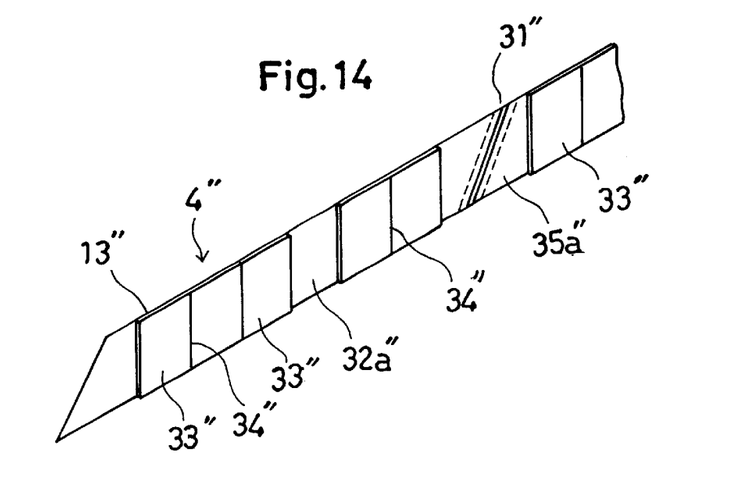
FIG. 14 is a perspective view showing the same tape after completing a half-cutting step.

In Step 46, the polarizer layer and protective layer (not shown) of the strip series 3" are partially removed at the defective elements 32" and the connections 35" from the releasable layer 13", as represented by 32a" and 35a" in FIG. 14. As a result, a polarizer labelling tape 14" carrying only the acceptable polarizer elements 33" is obtained.

Figure 15:
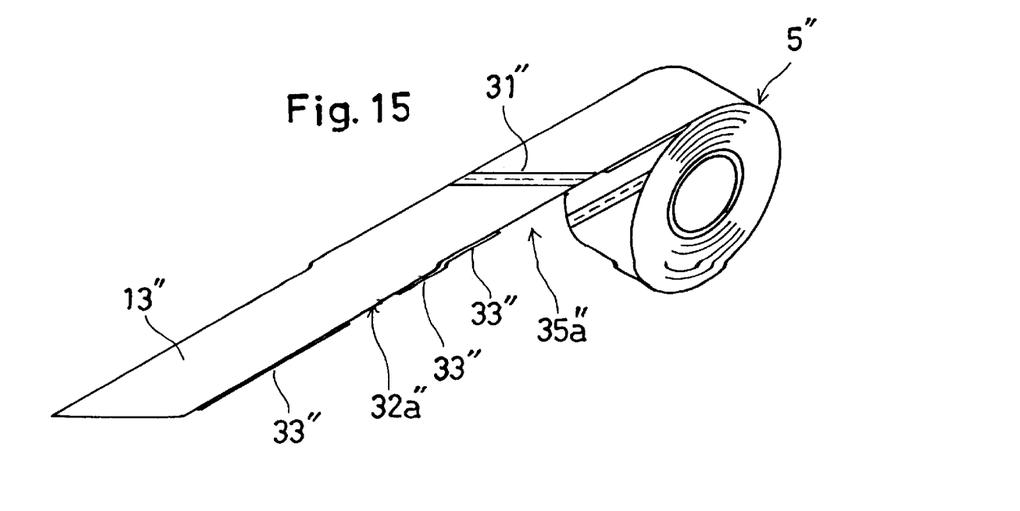
FIG. 15 is a perspective view showing a roll obtained by winding the same tape.
Figure 16:
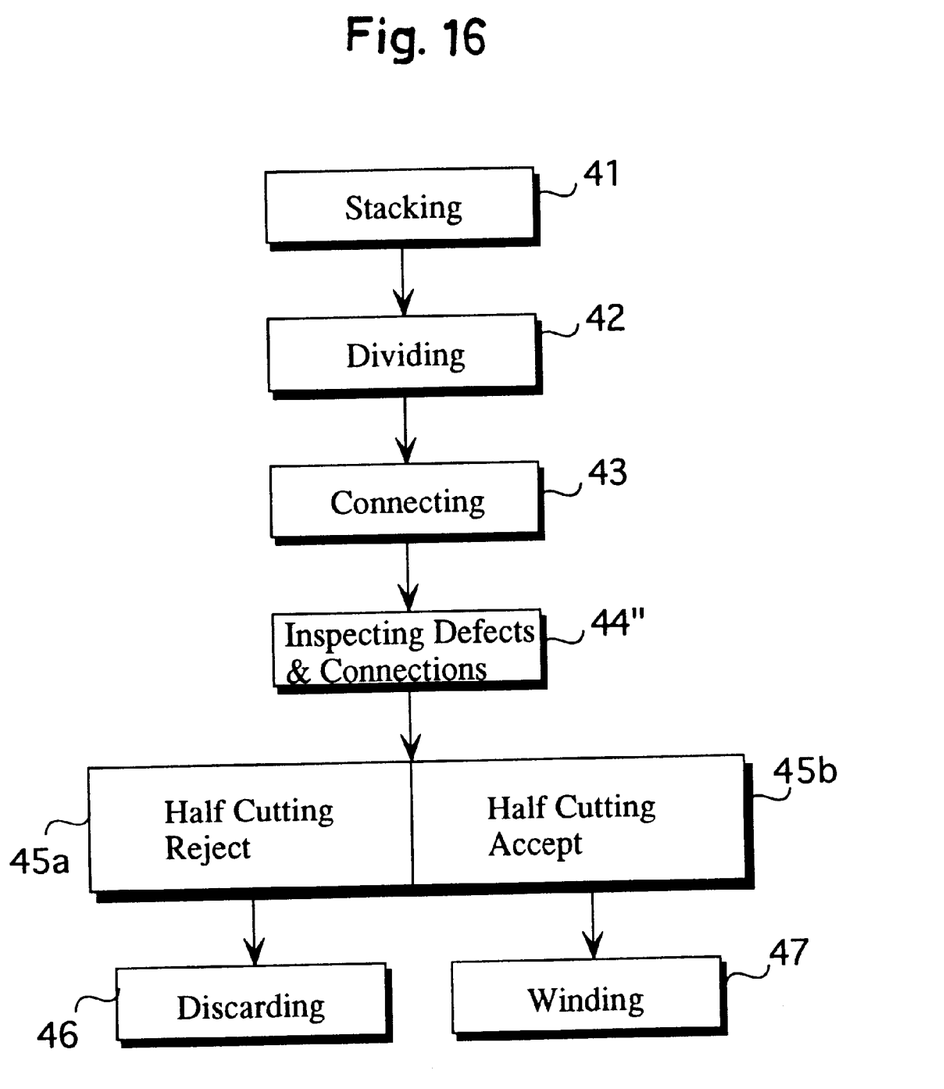
FIG. 16 is a flow diagram showing the entire method of making the polarizer labelling tape according to the third embodiment of the present inventionplan.

In Step 47, the polarizer labelling tape 4" is wound on a reel (not shown) with a predetermined torque to provide a roll 5", as shown in FIG. 15. The tape roll 5" thus obtained can be used for conveniently attaching the polarizer chips to successive liquid crystal panels.

The present invention being thus described, it is obvious that the same may be varied in many ways. For instance, the polarizer labelling tape 4, 4' or 4" need not be wound in a roll in case the tape is relative short. Such variations are not to be regarded as a departure from the spirit and scope of the present invention, and all such modifications as would be obvious to those skilled in the art are intended to be included within the scope of the following claims.

What is claimed is:

1. A polarizer labelling tape comprising:
   a series of at least three releasable strips which are longitudinally connected end-to-end to each other by adhesive strips arranged at respective connections between the releasable strips; and
   a plurality of polarizer elements releasably attached to and along the series of releasable strips, each of the polarizer elements being covered by a protective layer.

2. The polarizer labelling tape according to claim 1, wherein the tape is wound into a roll.

3. The polarizer labelling tape according to claim 1, wherein each of the releasable strips has a parallel pair of longer edges and a parallel pair of shorter edges, the shorter edges extending perpendicularly to the longer edges.

4. The polarizer labelling tape according to claim 3, wherein at least two of the polarizer elements are spaced from each other longitudinally of the series of releasable strips.

5. The polarizer labelling tape according to claim 3, wherein all of the polarizer elements are arranged intimately with each other longitudinally of the series of releasable strips.

6. The polarizer labelling tape according to claim 1, wherein each of the releasable strips has a parallel pair of longer edges and a parallel pair of shorter edges, the shorter edges being inclined relative to the longer edges.

7. The polarizer labelling tape according to claim 6, wherein two of the polarizer elements located adjacent to each of the connections between the releasable strips are spaced from each other longitudinally of the series of releasable strips.

* * * * *